(12) United States Patent
Suzio et al.

(10) Patent No.: US 9,256,740 B2
(45) Date of Patent: Feb. 9, 2016

(54) METHOD AND SYSTEM FOR ANALYSIS OF SECURITY EVENTS IN A MANAGED COMPUTER NETWORK

(71) Applicant: International Business Machines Corporation, Armonk, NY (US)

(72) Inventors: Michael John Suzio, Royal Oak, MI (US); Gary Israel Givental, Royal Oak, MI (US); HuyAnh Dinh Ngo, Windsor, CA (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 14/227,610

(22) Filed: Mar. 27, 2014

(65) Prior Publication Data

US 2014/0215624 A1  Jul. 31, 2014

Related U.S. Application Data

(63) Continuation of application No. 11/359,261, filed on Feb. 22, 2006, now abandoned.

(60) Provisional application No. 60/655,158, filed on Feb. 22, 2005.

(51) Int. Cl.
*G06F 11/00* (2006.01)
*G06F 21/55* (2013.01)
*H04L 29/06* (2006.01)

(52) U.S. Cl.
CPC .......... *G06F 21/554* (2013.01); *H04L 63/1416* (2013.01)

(58) Field of Classification Search
CPC ................. H04L 63/1416; H04L 63/1408
USPC ..................................... 726/22–25
See application file for complete search history.

(56) References Cited

U.S. PATENT DOCUMENTS

| 4,494,127 A | 1/1985 | King |
| 6,108,314 A * | 8/2000 | Jones et al. ............... 370/294 |

(Continued)

FOREIGN PATENT DOCUMENTS

| WO | WO 00/25527 | 5/2000 |
| WO | WO 00/34867 | 6/2000 |
| WO | WO 00/54458 | 9/2000 |

OTHER PUBLICATIONS

Denning, D.E., An Intrusion-Detection Model, Software Engineering, IEEE Transactions on; vol. SE-13, Issue 2, Feb. 1987 pp. 222-232. [See pp. 1-2, paragraphs I-II].

(Continued)

*Primary Examiner* — Anthony Brown
(74) *Attorney, Agent, or Firm* — King & Spalding

(57) ABSTRACT

An event retrieval and analysis system compares counts of event data for a device to stored profile counts to determine if alerts should be triggered. Event data can be retrieved by a sensor. Rules for analyzing the event data can be retrieved based on the device. The event data is analyzed based on the rules to determine recordable events. Recordable events are organized into categories representing a type or severity of attack. Current event counts are calculated by summing the recordable events for each category. A normal profile is retrieved for the device and compared to the current event count. A percentage change trigger can be retrieved from a threshold matrix based on the current event count. The percentage increase of the current event count over the normal profile is calculated and compared to the percentage change trigger to determine if an alert is triggered by the analysis system.

8 Claims, 13 Drawing Sheets

(56) References Cited

U.S. PATENT DOCUMENTS

| | | | |
|---|---|---|---|
| 6,490,256 | B1 | 12/2002 | Jones et al. |
| 6,839,850 | B1 | 1/2005 | Campbell et al. |
| 7,006,992 | B1 | 2/2006 | Packwood |
| 7,039,954 | B2 | 5/2006 | Lingafelt et al. |
| 7,246,376 | B2 | 7/2007 | Moharram |
| 7,266,754 | B2 | 9/2007 | Shah et al. |
| 7,359,865 | B1 | 4/2008 | Connor et al. |
| 2002/0078381 | A1 | 6/2002 | Farley et al. |
| 2002/0107953 | A1 | 8/2002 | Ontiveros et al. |
| 2002/0147622 | A1* | 10/2002 | Drolet et al. ............ 705/7 |
| 2003/0009693 | A1 | 1/2003 | Brock et al. |
| 2003/0065613 | A1 | 4/2003 | Smith |
| 2003/0145232 | A1* | 7/2003 | Poletto et al. ............ 713/201 |
| 2004/0044912 | A1 | 3/2004 | Connary et al. |
| 2004/0143756 | A1 | 7/2004 | Munson et al. |
| 2005/0060562 | A1 | 3/2005 | Bhattacharya et al. |
| 2006/0070130 | A1* | 3/2006 | Costea et al. ............ 726/24 |

OTHER PUBLICATIONS

Porras, P.A., et al., Penetration State Transition Analysis: A Rule-Based Intrusion Detection Approach, Computer Security Applications Conference, 1992., Proceedings., Eight Annual Nov. 30-Dec. 4, 1992, pp. 220-229 [See pp. 221-226, paragraphs 2-4].

Lindqvist, U, et al., eXpert-BSM: A Host-Based Intrusion Detection Solution for Sun Solaris, Computer Security Applications Conference, 2001., ACSAC 2001., Proceedings 17$^{th}$ Annual Dec. 10-12, 2001, pp. 240-251. [See pp. 7-9, paragraph 4.3-4.4.].

Debar, H., et al, A Revised Taxonomy for Intrusion-Detection Systems, IBM Research Report, 1999. [See pp. 4-8, paragraphs 4-5].

NetRanger User's Guide Version 2.1.1, Cisco Systems, Inc., 1998. [See pp. 1-19, paragraph 1].

Porras, Phillip A., et al., Mission-Impact-Based Approach to INFOSEC Alarm Correlation, Lecture Notes in Computer Science, Proceedings Recent Advances in Intrusion Detection, Oct. 2002, p. 95-114. [See pp. 2-15, paragraphs 2-4].

Bace, Rebecca, An Introduction to Intrusion Detection & Assessment for System and Network Security Management, Infidel, Inc. for ICSA (White Paper) Apr. 1999. [See pp. 11-16].

Hunteman, William, Automated Information System—(AIS) Alarm System, Los Alamos National Laboratory, http://csrc.nist.gov/nissc/1997/proceedings/394.pdf. [See pp. 4-10, paragraphs 3-6].

Luckham, David C., et al., Complex Event Processing in Distributed Systems, Stanford University Technical Report CSL-TR-98-754, Mar. 1998, 28 pages. [See pp. 4-8, paragraph 2].

Mukherjee, B., et al., Network Intrusion Detection, IEEE Network Magazine: May/Jun. 1994, vol. 8, Issue: 3, pp. 26-41. [See pp. 33-39].

Kumar, Sandeep, et al., An Application of Pattern Matching in Intrusion Detection, Technical Report 94-013, Department of Computer Sciences, Purdue University, Mar. 1994, http://citeseer.ist.psu.edu/kumar94application.html. [See pp. 15-26, paragraph 4].

Jou,. Frank Y., et al., Architecture Design of a Scalable Intrusion Detection System for the Emerging Network Infrastructure, DARPA Order No. E296, Apr. 1997 http://citeseer.ist.psu.edu/jou97architecture.html. [See pp. 24-28, paragraph 4.1.3.2].

RealSecure™, Network Sensor User Guide, Version 5.0, © 2000 by Internet Security Systems, Inc. [See pp. 5-31, chapters 2-3].

D'Amico, Anita, Assessment of Open e-Security Platform198: Vendor-Independent Central Management of Computer Security Resources, Applied Visions, Inc., 1999 White Paper. [See pp. 6-10].

Imamura et al., Potential Application of Training Based Computation to Intrusion Detection, IEEE, Jul. 2004, pp. 411-414.

Yarng et al., Profiling Cyber Attacks Using Alert Regression Profiles, IEEE, Globecom, 2003, pp. 1456-1460.

* cited by examiner

| RANGE | 1 | 2 | 3 |
|---|---|---|---|
| Minimum Count | 0 | 501 | 1501 |
| Maximum Count | 500 | 1500 | (no limit) |
| % Change to Trigger Alert | 1000% | 100% | 50% |

Figure 11

METHOD AND SYSTEM FOR ANALYSIS OF SECURITY EVENTS IN A MANAGED COMPUTER NETWORK

STATEMENT OF RELATED PATENT APPLICATION

This patent application is a continuation of U.S. patent application Ser. No. 11/359,261, filed on Feb. 22, 2006, which claims priority under 35 U.S.C. §119 to U.S. Provisional Patent Application No. 60/655,158, filed Feb. 22, 2005. Each application is hereby fully incorporated herein by reference.

FIELD OF THE INVENTION

The present invention relates to the security of computing devices in a computer network. More particularly, the present invention relates to a method and system for receiving a set of data for a device, categorizing the data based on potential security events, and comparing the current number potential security events to a stored value for the device to determine if an alert should be activated.

BACKGROUND OF THE INVENTION

As e-commerce, or doing business over the Internet, becomes a way of life rather than being characterized as novel commercial activity, protecting computer systems against malicious attacks or alleged pranks becomes vital to both businesses and individuals because of potential economic disasters. In other words, because businesses and individuals are becoming more and more dependent upon computer networks that are integrated with the Internet, any interruptions in service or attacks on such computer systems could have devastating financial repercussions.

Security threats come in a variety of forms and almost always result in a serious disruption to a network. Hackers can gain unauthorized access by using a variety of readily available tools to break into the network. The hacker no longer needs to be an expert or understand the vulnerabilities of the network—they only need to select a target and attack, and once in, the hacker has control of the network. Denial of Service (DoS) and Distributed Denial of Service (DDoS) attacks aim to disable a device or network so users no longer have access to network resources. Using Trojan horses, worms, or other malicious attachments, hackers can plant these tools on countless computers. Worms are programs designed to infect networks, such as the Internet. A worm travels from network to network replicating itself along the way. Trojan horses pretend to be a program that the user wishes to launch. A Trojan horse can be a program or file that disguises itself as normal, helpful programs or files, but in fact are viruses.

In addition, viruses can attach to email and other applications and damage data and cause computer crashes. A computer virus is a broad term for a program that replicates itself. A virus can cause many different types of damage, such as deleting data files, erasing programs, or destroying everything found on a computer hard drive. Not every virus can cause damage; some viruses simply flash annoying messages on a computer screen. A virus can be received by downloading files from the Internet to a personal computer or through electronic mail. Users increase the damage by unknowingly downloading and launching viruses. Viruses are also used as delivery mechanisms for hacking tools, putting the security of the organization in doubt, even if a firewall is installed. Hackers can deploy sniffers to capture private data over networks without the users of this information being aware that their confidential information has been tapped or compromised.

As noted above, the nature of a distributed network makes it vulnerable to attack. The Internet was designed to allow for the freest possible exchange of information, data, and files. However, this free exchange of information carries a price: Some users will try to attack the Internet and computers connected to the Internet; while others will try to invade other users' privacy and attempt to crack databases of sensitive information or snoop around for information as it travels across a network.

The field of managed security grew out of a need by companies with distributed networks to protect and monitor their devices on their network from attacks. Through a thorough understanding of the devices and network topology security providers attempt to monitor the network, and the data flowing through it, to recognize a potential attack or security event before the network is adversely affected. Security providers typically monitor a customer's network by obtaining information from intrusion detection sensors and other network devices. One conventional method of analyzing this data is through the use of security engineers manually looking at one or more screens of data representing customers' networks to determine if an attack is occurring. However, even in a relatively small network, the network traffic can generate an excessive amount of data, such that, it is unlikely that the security engineer could spot all or even most of the attacks.

In addition, the conventional method is not an efficient and effective use of engineering resources. Instead of searching to determine where a problem might be, it would be more efficient to signal the security engineers when network usage is outside a predetermined norm so that the engineer's time is spent solving, not searching for, the problem. Furthermore, under the conventional method, security providers have a difficulty retaining qualified security personnel because the monotonous time spent looking for problems is mentally and physically stressful, leading to a high burnout rate.

Accordingly, there is a need in the art for an automated system for receiving categorized event data representing a type or severity of an attack on the network and comparing the count of each category of event data to a normal count of potential attacks on the device to determine if an alert should be generated, the alert representing a significant increase in one or more types of attacks on the device. Furthermore, there is a need in the art for generating a normalized profile of event count data for each device in the network and updating this normalized profile as the network matures so that a determination can be made if activity rises to the level such that alerts should be triggered and action should be taken by the security engineers.

SUMMARY OF THE INVENTION

The event retrieval and analysis system can retrieve event data from a device on a network, categorize recordable events in the event data, and compare the categorized counts to stored profiles of data for that device against a threshold matrix to determine if alerts should be triggered for the device. In support of its alert determination, a sensor associated with a device passes event data to the analysis system. The event data can then be sorted into categories of recordable events. Categories generally represent one or more groupings of security events in the event data that represent a type or severity of a potential attack on the device or network. For one aspect, the categories being summarized include low priority event count, medium priority event count, high priority event count, total event count, unique signatures count, scanned event count, worm signature event count, sweeps signature event count, hot decodes signature event count, and staging signature event count.

Each category can be summed into current count data and compared to a normal profile or prior event count data for the device and stored in a database. A threshold matrix can be retrieved and used to analyze the current event count data as compared to the normal profile or prior event count data to determine if an alert should be triggered. The alert can include an audible or visual alarm, a report describing the reason for the alert, or a notification of the alert sent to a pager, phone, cell phone, email address or workstation for viewing and analysis by a technician. The threshold matrix typically includes a table having rows for "minimum count" and "maximum count", and "percentage change required to trigger an alert". The threshold matrix can also include one or more columns of count ranges that provide the range of event count and the percentage change needed at that event count level to trigger an alert.

For one aspect of the present invention the analysis system can receive a current event count for a category of recordable events for a device in a computer network. The device can be the entire network, a portion of the network, or a single node in the network. A normal profile for the device can be retrieved from a database. The normal profile typically includes normal event counts in each category for the device. The difference between the current event count and the normal event count can be calculated for each category. If the current event count is greater than the normal event count, a percentage increase can be calculated by dividing the difference between the current event count and the normal event count by the normal event count. An alert percentage can be obtained from a table stored in a database. The alert percentage is typically determined based on the current event count for the category. Each alert percentage can be associated with a range of current event counts. The correct alert percentage is determined by finding the range of count data that the current event count data fits in and retrieving the associated alert percentage. A comparison can then be made between the alert percentage and the percentage increase of event counts. Percentage increase for event counts greater than or equal to the alert percentage will result in an alert being triggered in the analysis system.

For another aspect of the present invention, the analysis system can receive a current event count for a category of recordable events for a device in a computer network. A previous profile count for the device can be retrieved from a database. The previous profile count typically represents event count data of the device for the most recently completed event count analysis. The difference between the current event count and the previous profile count can be calculated for each category. If the current event count is greater than the previous profile count, a percentage increase can be calculated. An alert percentage based on the current event count can then be obtained from a table stored in a database. A comparison can then be made between the alert percentage and the percentage increase of event counts. Percentage increase for event counts greater than or equal to the alert percentage will result in an alert being triggered in the analysis system.

For a further aspect of the present invention, the analysis system can receive a current event count for a category of recordable events for a device in a computer network. Two or more previous profile counts for the device can be retrieved from a database. An average profile count can be determined for each category in the previous profile counts by summing the previous profile counts for a category and dividing the sum by the total number of profile counts retrieved. The difference between the current event count and the average profile count can be calculated for each category. If the current event count is greater than the average profile count, a percentage increase can be calculated. An alert percentage based on the current event count can then be obtained from a table stored in a database. A comparison can then be made between the alert percentage and the percentage increase of event counts. Percentage increase for event counts greater than or equal to the alert percentage will result in an alert being triggered in the analysis system.

For yet another aspect of the present invention, the analysis system can receive event data for a device from sensors and other devices in the computer network. The sensors typically review data packets for intrusion events or recordable events that may be an attack or a precursor to an attack on the device. Device data can be obtained from a database. The device data can include information related to the device's state, including the "normal" profiles of a given sensor at the device and any information about open alert tickets associated with the device. One or more rules can be retrieved from cache and applied by a rules engine to the event data to determine if there are any recordable events. Each recordable event can be placed into one or more categories and the current total event count for each category can be calculated by summing all of the recordable events in a category. A normal profile for the device can be retrieved from a database. The current total event count can then be compared to the normal profile count for the first category to determine if there is an increase in the event count over the normal profile count which may represent an attack on the device.

BRIEF DESCRIPTION OF THE DRAWINGS

For a more complete understanding of the exemplary embodiments of the present invention and advantages thereof, reference is now made to the following description in conjunction with the accompanying drawings in which:

FIG. 11 is block diagram of a matrix used in the comparison of data for a device in accordance with an exemplary embodiment of the present invention.

DETAILED DESCRIPTION OF THE EXEMPLARY EMBODIMENTS

Figure 1:
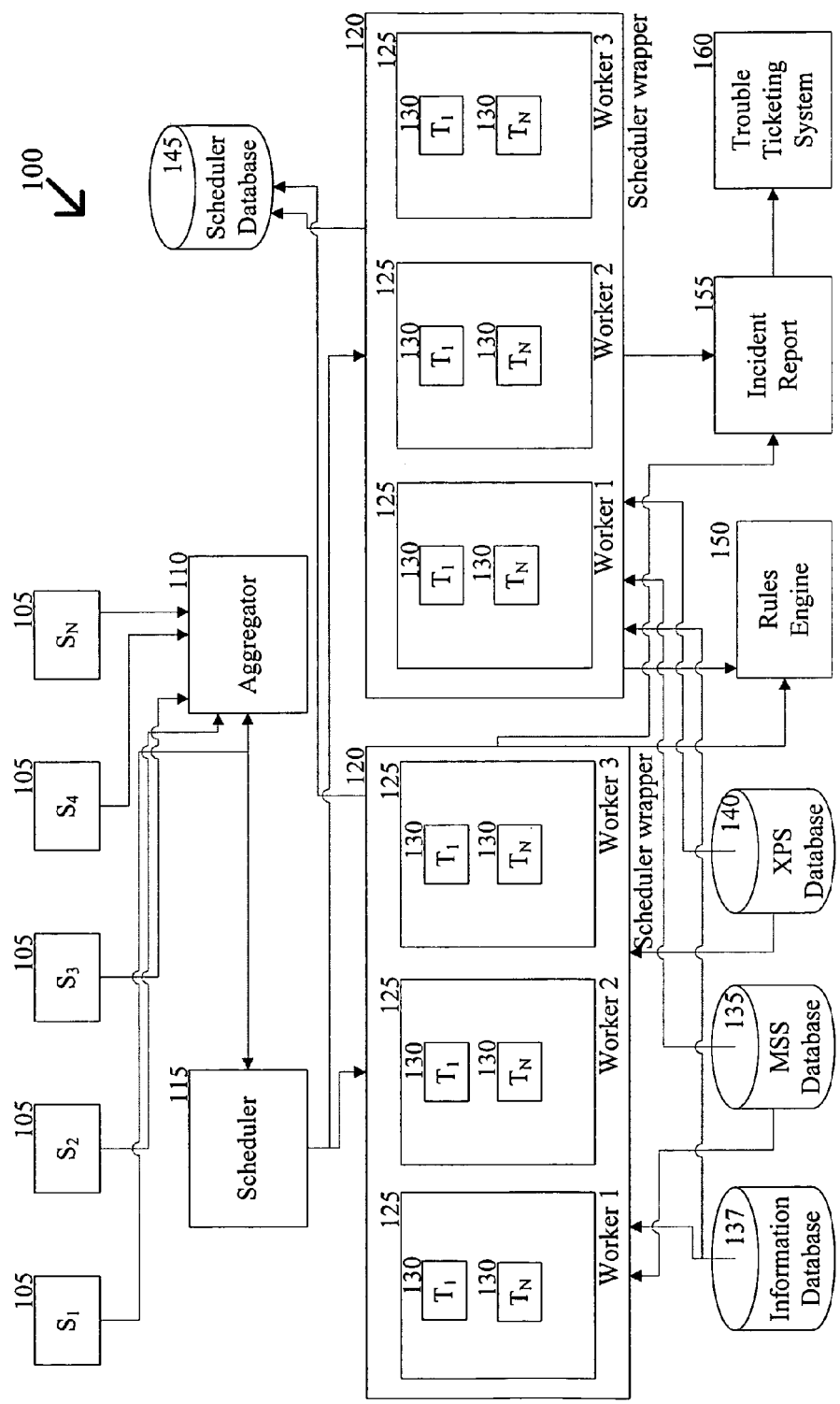
FIG. 1 is a block diagram illustrating an exemplary operating environment for implementation of various embodiments of the present invention.

The present invention supports a computer-implemented method and system for retrieval and analysis of event data in a networked computing system. Exemplary embodiments of the present invention can be more readily understood by reference to the accompanying Figures. Although exemplary embodiments of the present invention will be generally described in the context of a software module and operating system running on a network, those skilled in art will recognize that the present invention can also be implemented in conjunction with other program modules for other types of computers. Furthermore, those skilled in the art will recognize that the present invention may be implemented in a stand-alone or in a distributed computing environment.

In a distributed computing environment, program modules may be physically located in different local and remote memory storage devices. Execution of the program modules may occur locally in a stand-alone manner or remotely in a client/server manner. Examples of such distributed computing environments include local area networks, enterprise wide computer networks, and the global Internet.

The detailed description that follows is represented largely in terms of processes and symbolic representations of operations by conventional computing components, including processing units, memory storage devices, display devices, and input devices. These processes and operations may utilize conventional computer components in a distributed computing environment.

The processes and operations performed by the computer include the manipulation of signals by a processing unit or remote computer and the maintenance of these signals within data structures resident in one or more of the local or remote memory storage devices. Such data structures impose a physical organization upon the collection of data stored within a memory storage device and represent specific, electrical or magnetic elements. The symbolic representations are the means used by those skilled in the art of computer programming and computer construction to most effectively convey teachings and discoveries to others skilled in the art.

Exemplary embodiments of the present invention include a computer program that embodies the functions described herein and illustrated in the appended flowcharts. However, it should be apparent that there could be many different ways of implementing the invention in computer programming, and the invention should not be construed as limited to any one set of the computer program instructions. Furthermore, a skilled programmer would be able to write such a computer program to implement a disclosed embodiment of the present invention without difficulty based, for example, on the flowcharts and associated description in the application text. Therefore, disclosure or a particular set of program code instructions is not considered necessary for an adequate understanding of how to make and use the present invention. The inventive functionality of the computer program will be explained in more detail in the following description and is disclosed in conjunction with the remaining Figures illustrated in the program below.

Referring now to the drawings, in which like numerals represent like elements throughout the several Figures, aspects of the present invention and an exemplary operating environment for the implementation of the present invention will be described. FIG. 1 is a block diagram illustrating an event retrieval and analysis system 100 constructed in accordance with an exemplary embodiment of the present invention. The exemplary event analysis system 100 includes multiple sensors 105, an aggregator 110, a scheduler 115, multiple scheduler wrappers 120, an MSS database 135, an information database 137, an XPS database 140, a scheduler database 145, an information database 137a rules engine 150, and a trouble ticketing system 160.

The sensors 105 are communicably attached via a distributed computer network to the aggregator 110. In one exemplary embodiment, the sensors 105 receive event data from one or more devices in a networked computing system. The aggregator 110 is communicable attached via a distributed computer network to the scheduler 115. The aggregator receives all the incoming event data from the various computer sensors 105. The aggregator 110 typically arranges this data and forwards it to the scheduler 115 for processing.

The scheduler 115 is communicably attached via a distributed computer network to the aggregator 110 and to several schedule wrappers 120. The scheduler 115 handles management of the event data being received from the sensors 105 through the aggregator 110. In one exemplary embodiment, upon startup of this system 100, the scheduler 115 registers as a client to the aggregator 110 to receive the event data from the aggregator 110. The scheduler 115 then converts the event data stream into discrete work tasks, which can then be sent out to the scheduler wrappers 120 for processing. In one exemplary embodiment, the scheduler 115 communicates with the scheduler wrappers 120 via Java RMI.

The scheduler wrappers 120 are communicably attached via a distributed computer network to the scheduler 115, the MSS database 135, the information database 137, the XPS database 140, the scheduler database 145, and the rules engine 150. The scheduler wrapper 120 conducts the processing of the event data received from the scheduler 115. When a scheduler wrapper 120 is initiated, it registers with the scheduler 115, indicating that the scheduler wrapper 120 is ready to accept tasks or event data for processing. At that point, the scheduler 115 can begin dispatching tasks to the scheduler wrapper 120 for it to then dispatch to workers 125 and worker threads 130.

Each scheduler wrapper 120 represents a distinct process running on the scheduler 115. The scheduler wrapper 120 is responsible for starting up or initiating individual worker threads 130 and managing the worker thread's 130 life cycle. The scheduler wrapper 120 receives Java RMI calls from the scheduler 115 and communicates to the scheduler 115 on behalf of its workers 125. In one exemplary embodiment, the scheduler wrapper 120 is a very light wrapper around a set of distinct worker threads 130 running within a single Java VM process.

A scheduler 115 may run any number of scheduler wrapper 120 processes, each in a distinct java VM instance. A given scheduler wrapper 120 may run any arbitrary number of worker threads 130, although, in one exemplary embodiment, the processing degradation often occurs with approximately thirty distinct worker threads 130 in a single scheduler wrapper 120. In one exemplary embodiment, each worker 125 within a scheduler wrapper 120 operates twenty worker threads 130.

The worker 125 is a node in the scheduler wrapper 120 that processes analysis tasks on the event data. Each worker 125 operates as a thread within the scheduler wrapper 120, essentially looping forever in a processing loop of receiving analysis tasks passed on from the scheduler wrapper 120. The worker 125 will typically receive an analysis task containing new event data to process from the scheduler 115. The worker 125 retrieves the last known device state for the device in question and runs the analysis task using the data received. The worker 125 then triggers any alerts to the trouble ticketing system 160.

The MSS database 135 is communicably attached via a distributed computer network to the scheduler wrapper 120. The MSS database 135 typically contains general research information relating to attack data and specific customer network data to give a richer set of data for the rules engine 150 to use in making decisions it interprets in the event data. The MSS database may further include firewall logs, the customer's security information, information about the customer's network topology, scanning information, and indications of which IP is on the customer's network protocol. The worker thread 130 can obtain the data in the MSS database 135 and use it to assist the worker thread in its decisional processes with regards to what particular event data may mean.

The information database 137 is communicably attached via a distributed computer network to the scheduler wrapper 120 and the scheduler 115. The information database 137 typically contains device data not contained in the other databases of the event analysis system 100. In addition, the information database 137 can contain information from the trouble ticketing system 160, information related to the network topology and platform of customers, operating system information, known critical servers, customer specific information, and DMS lookup information. The worker thread 130 can obtain the data in the information database 137 and use it to assist the worker thread in its decisional processes with regards to what particular event data may mean.

The XPS database 140 is communicably attached via a distributed computer network to the scheduler wrapper 120. The XPS database 140 typically contains historical event data and summarized information generated by the event analysis system 100. The worker thread 130 can obtain the data in the XPS database 140 and use it to assist the worker thread in its decisional processes with regards to what particular event data may mean.

The scheduler database 145 is communicably attached via a distributed computer network to the scheduler wrapper 120. The scheduler database 145 includes the data processed by the worker threads 130, a copy of the decisions made by the worker threads 130, the "normal" profiles for the devices on each network being analyzed by the worker threads 130, the device states for the devices on each network being analyzed, the state of the networks being analyzed, stored event data counts for each category of data for each of the devices on each network being analyzed, and a listing of rules to be applied to each device by the worker threads 130. Those of ordinary skill in the art will recognize that the information described in the MSS database 135, the information database 137, the XPS database 140, and the scheduler database 145 can be stored in one or several storage devices and that the particular storage device the data is stored and the specific number of storage devices used to store the data can be easily modified and adjusted based on the users specific needs.

The rules engine 150 is communicably attached via a distributed computer network to the scheduler wrapper 120 and the trouble ticketing system 160. The rules engine 150 receives event data and processes one or more rules against that data. The rules analyzed against the event data can be the same for every network or every device on a particular network. On the other hand, the rules can be different for every device on the network. The rules engine 150 can generate alerts based on event data that triggers a rule. The alerts can be transmitted by the rules engine 150 to the trouble ticketing system 160 through the use of an incident report 155. On the other hand, the rules engine 150 can generate and alert and transmit that alert to a notifier (not shown). The alert from the rules engine 150 can include instructions on the method of alert produced by the notifier. In one exemplary embodiment, alerts can include email notifications, text messages, pages to a cell phone or pager, audible messages delivered to a workstation, phone, or cell phone, an incident report 155, textual messages sent to a workstation, visual or audible alarms sent to a workstation or other methods of alerting known to those of ordinary skill in the art.

The incident report 155 is typically generated by the rules engine 150 by a worker thread 130. The incident report 155 can include information related to the fact that an alert has occurred, basic information about the customer associated with the device from which the event data was received, the device from which the event data was received, the type of alert, why the alert was triggered, and the percentage increase in current event counts for the category that triggered the alert. In one exemplary embodiment, the incident report 155 is a detailed breakdown of events leading up to the generation of an alert by the rules engine 150. The data in the exemplary incident report 155 is sorted by each signature name, then by source IP, then by destination IP. In addition each IP address is examined based on the customer information to determine if the IP address is external to the customer, internal, or a critical system for the customer. The trouble ticketing system 160 is communicably attached via a distributed computer network to the scheduler wrapper 120 and the rules engine 150. The trouble ticketing system 160 generates trouble tickets based on alerts received from the rules engine 150.

Figure 2:
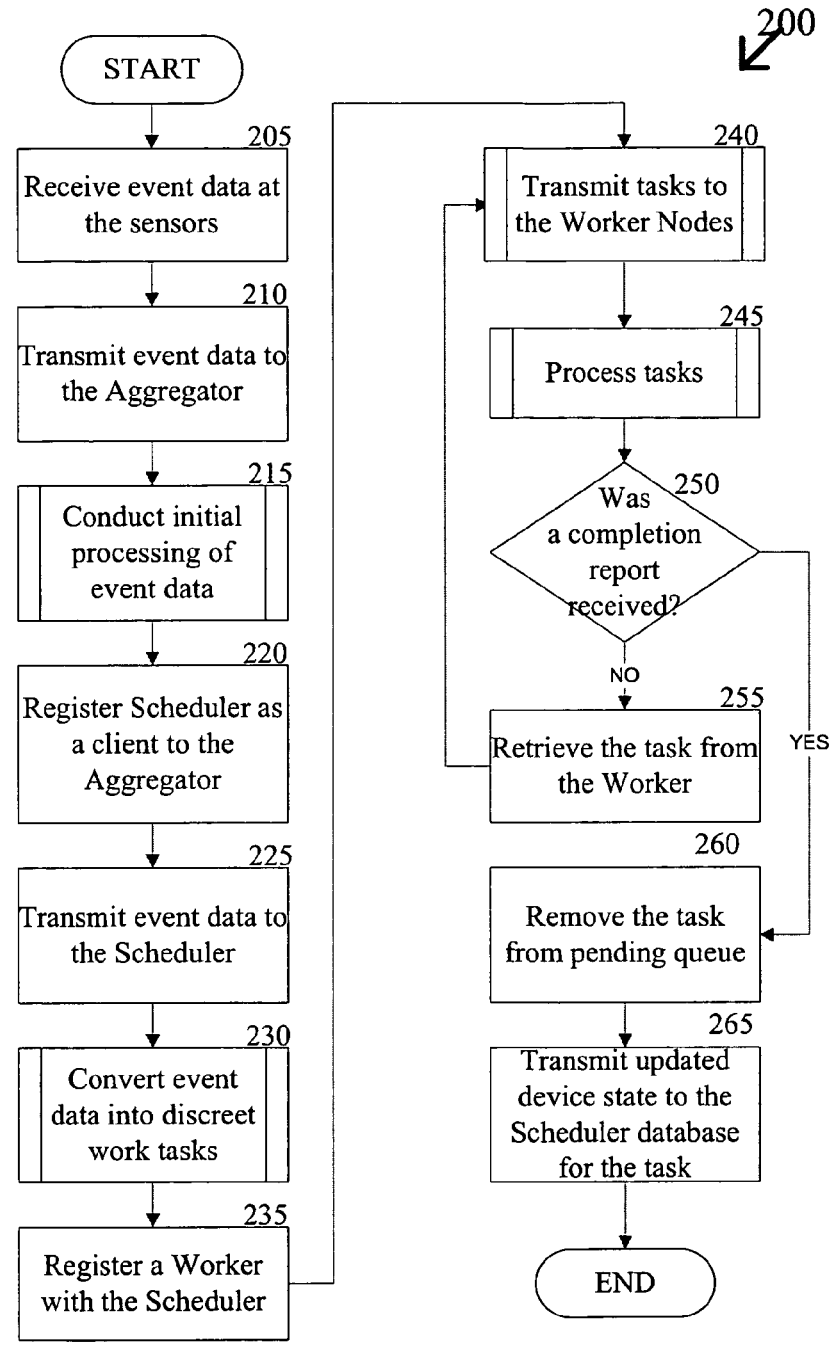
FIG. 2 is a flowchart illustrating a process for receiving a series of event data from multiple sensors in a network computing system and processing information for the event data in accordance with an exemplary embodiment of the present invention.

FIGS. 2 through 10 are logical flowchart diagrams illustrating the computer-implemented processes completed by exemplary methods for receiving and analyzing event data by the event analysis system 100. FIG. 2 is a logical flowchart diagram presented to illustrate the general steps of an exemplary process 200 for receiving and analyzing event data from a device in a computer network within the operating environment of the exemplary event analysis system 100 of FIG. 1.

Now referring to FIGS. 1 and 2, the exemplary method 200 begins at the START step and proceeds to step 205, where event data for a device on a network is received at a sensor 105. In step 210, the sensor 105 transmits the event data to the aggregator 110. In step 215, the aggregator 110 conducts initial processing of the event data received from the sensors 105. In one exemplary embodiment, the initial processing of the event data includes determining the device the event data is associated with and the customer for whom the device is being monitored. The scheduler 115 registers itself as a client to the aggregator 110 in step 220.

In step 225, the aggregator 110 transmits the event data to the scheduler 115. The scheduler 115 converts the event data into discrete work tasks in step 230. In step 235, the scheduler wrapper 120 registers itself with the scheduler 115. The scheduler 115 transmits the discrete work tasks to the workers 125 in the scheduler wrapper 120 in step 240. In step 245, the rule engine 150 processes rules on the work tasks passed to it by the worker thread 130.

In step 250, an inquiry is conducted by the scheduler 115 to determine if a completion report was received from the worker thread 130 through the scheduler wrapper 120. If a completion report was not received from the scheduler wrapper 120, the "NO" branch is followed to step 255, where the scheduler 115 retrieves the discrete work task from the worker thread 130. The process then returns to step 240 for retransmission of the discrete work task to another worker thread 130 in the worker 125 for processing. Returning to step 250, if a completion report was received from the scheduler wrapper 120 by the scheduler 115, then the "YES" branch is followed to step 260. In step 260, the scheduler 115 removes the task from its pending queue list. In step 265, the scheduler wrapper 120 transmits updated device state data to the scheduler database 145 for the discrete work task completed. The process then concludes at the END step.

Figure 3:
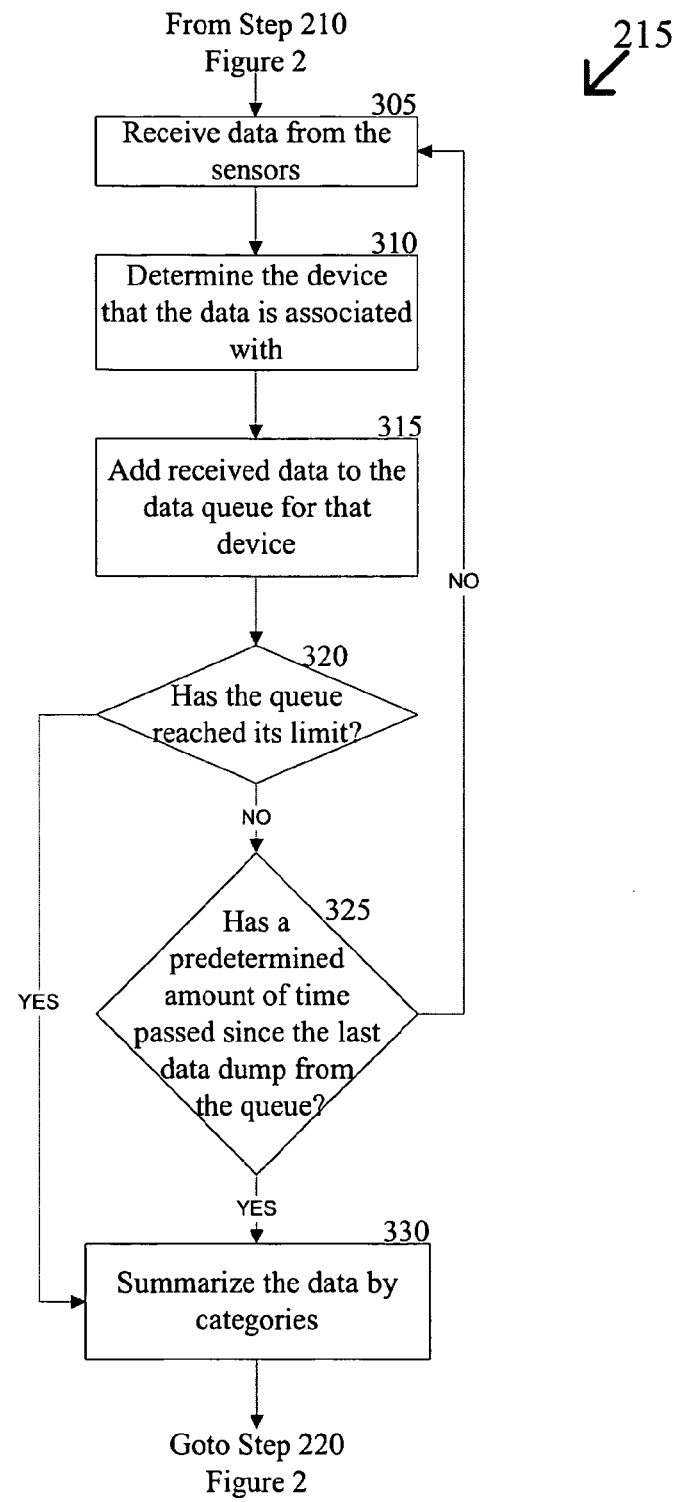
FIG. 3 is a flowchart illustrating a process for conducting the initial processing of event data in accordance with an exemplary embodiment of the present invention.

FIG. 3 is a logical flowchart diagram illustrating an exemplary computer-implemented method for the aggregator 110 to conduct initial processing of the event data received from the sensor 105, as completed by step 215 of FIG. 2. Referencing FIGS. 1, 2, and 3, the exemplary method 215 begins by receiving the event data from the individual sensor 105 in step 305. In step 310, the aggregator 110 determines which device that the event data is associated with. In one exemplary embodiment, event data is associated with the device if the event data is based on data packets being sent to or from the device.

In step 315, the aggregator 110 adds the received event data to a data queue for that device. In an alternative embodiment, the aggregator 110, bypasses the queuing step and passes the event data directly to the scheduler 115. In step 320, an inquiry is conducted by the aggregator 110 to determine if the data queue for that device has reached its limit. In one exemplary embodiment, the data queue reaches its limit when it has stored 1000 logs of data. In an alternative embodiment, the data queue for a device reaches it limit when it can no longer hold additional event data in the queue or does not have sufficient room to receive and store an additional download of event data from the sensor 105. In another alternative embodiment, the data queue reaches its limit when it has stored a certain amount of data, irrespective of whether there is additional room in the data queue for more event data. If the data queue has not reached its limit, the "NO" branch is followed to step 325.

If the data queue has reached its limit, the "YES" branch is followed to step 330, where the aggregator 110 summarizes the data by categories. Categories generally represent one or more groupings of security events in the event data that represent a type or severity of a potential attack on the device or network. In one exemplary embodiment, the categories being summarized include low priority event count, medium priority event count, high priority event count, total event count, unique signatures count, scanned event count, worm signature event count, sweeps signature event count, hot decodes signature event count, and staging signature event count.

The scanned signature event count typically represents known scanning attacks against the device or network. Worm signature event count typically represents known worm attacks against the device or network. Sweeps signature event count typically represents known network sweep attacks against the network. Hot decodes signature event count typically represents high priority signatures that are currently being tracked by a technician at a workstation. In one exemplary embodiment, the hot decodes signature event count category uses a very sensitive threshold for determining alerts, such that almost any deviation from normal is considered significant and thus, worthy of sending out an alert by the rules engine 150. The staging signature event count typically represents signatures currently being tested for inclusion into other categories. Those of ordinary skill in the art will recognize that the categories that the security events in the event data are organized into can be modified and amended based on new attacks, changes to the devices being monitored, changes to the network topology for the networks being monitored, changes to existing attack methods, or other reasons known to those of ordinary skill in the art.

In step 325, an inquiry is conducted to determine if a predetermined amount of time has passed since the last data dump from the data queue in the aggregator 110 to the scheduler 115. In one exemplary embodiment, the predetermined amount of time has been set at ten minutes, such that, if the data queue does not reach a full limit in step 320 prior to the passing of ten minutes time since the last data dump from the queue, the aggregator 110 will automatically dump the event data from the queue to the scheduler 115. Those of ordinary skill in the art will recognize that the predetermined amount of time is adjustable from instantaneous to an infinite amount of time based on the technicians preferences and needs. In an alternative embodiment, the data is passed directly from the aggregator 110 to the scheduler 115 without queuing the event data, such that the need to determine if a predetermined amount of time has passed is eliminated. If the predetermined amount of time has not passed, the "NO" branch is followed to step 305 where additional event data can be received from the sensor 105. On the other hand, if the predetermined amount of time has passed since the last data dump from the data queue, the "YES" branch is followed to step 330, where the event data is summarized into categories by the aggregator 110. The process then continues to step 220 of FIG. 2.

Figure 4:
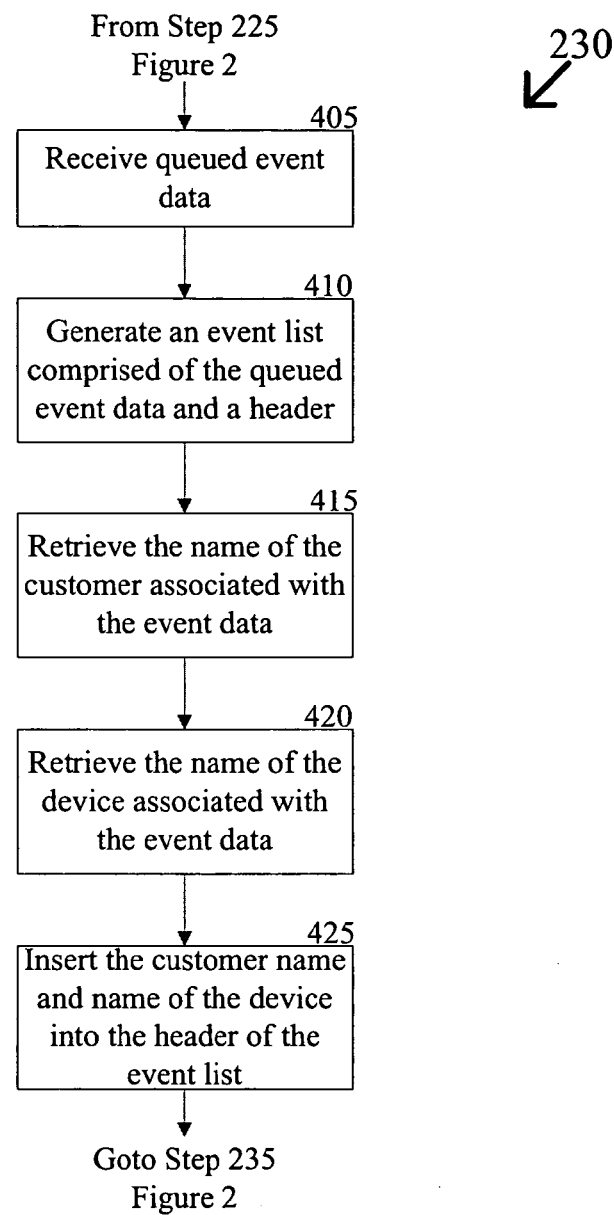
FIG. 4 is a flowchart illustrating a process for converting event data into discrete worker tasks in accordance with an exemplary embodiment of the present invention.

FIG. 4 is a logical flowchart diagram illustrating an exemplary computer-implemented method for converting event data into discrete work tasks at the scheduler 115 as complete by step 230 of FIG. 2. Now referring to FIGS. 1, 2 and 4, the exemplary method 230 begins at step 405, where scheduler 115 receives the queued event data from the aggregator 110. In step 410, the scheduler 115 generates an event list comprised of the queued event data and a header. The scheduler 115 retrieves the name of the customer associated with the event data from the scheduler database 145 in step 415. In step 420, the scheduler 115 retrieves the name of the device associated with the event data from the scheduler database 145. The scheduler 115 inserts the customer name and the device name into the header of the event list in step 425. The process continues to step 235 of FIG. 2.

Figure 5:
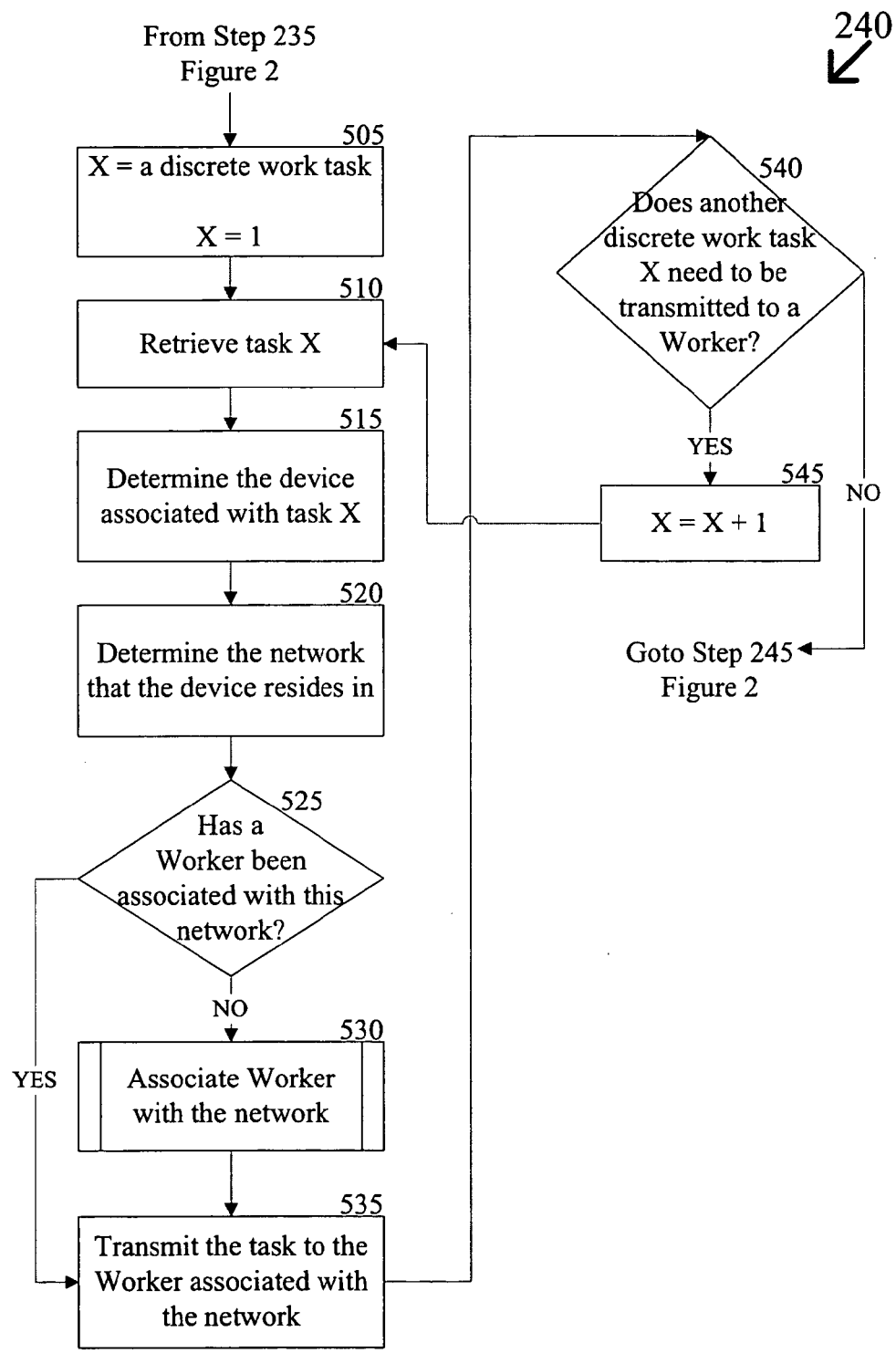
FIG. 5 is a flowchart illustrating a process for transmitting tasks to worker nodes in accordance with an exemplary embodiment of the present invention.

FIG. 5 is a logical flowchart diagram illustrating an exemplary computer-implemented method for transmitting discrete work tasks from the scheduler 115 to the workers 125, as complete by step 240 of FIG. 2. Now referring to FIGS. 1, 2, and 5, the exemplary method 240 begins with counter variable X being set equal to one in step 505. Counter variable X typically represents the discrete work task being handled by a worker 125 and received from the scheduler 115. In step 510, the scheduler 115 retrieves the first discrete work task from the event list. In step 515, the scheduler 115 determines the device associated with the first discrete work task. In one exemplary embodiment, the device is associated with the first discrete work task if the first discrete task includes event data from data packets sent to or from the device and received, copied, or intercepted by the sensor 105. In step 520, the scheduler 115 determines the computing network of the device. The network information is typically retrieved from the information database 137.

In step 525, an inquiry is conducted by the scheduler 115 to determine if a worker 125 is associated with the network on which the device is associated. In one exemplary embodiment, scheduler 115 receives event data for a given device, it will assign the work task to be processed on the worker 125 that is "bound" to the customer who own that device or asks that the device be monitored. By binding a given device and/or customer to a particular worker 125, the scheduler 115 assures that tasks for a device are processed sequentially. In one exemplary embodiment, once the scheduler 115 transmits the work task to the worker 125, the worker 125 has the responsibility of ensuring a first-in-first-out processing of tasks for a given device.

If a worker 125 has not been associated with this network, device or customer, the "NO" branch is followed to step 530, where the scheduler 115 associates a worker 125 with the particular network, device, or customer. Otherwise, the "YES" branch is followed to step 535, where the scheduler 115 transmits the discrete work task to the worker 125 associated with the network, device, or customer. In step 540, an inquiry is conducted by the scheduler 115 to determine if another discrete work task needs to be transmitted to one of the workers 125. In one exemplary embodiment, additional discrete work tasks are transmitted to workers 125 if additional tasks remain in the scheduler 115. If another discrete work task needs to be transmitted to a worker 125, the "YES" branch is followed to step 545, where the counter variable X is incremented by 1. The processing returns to step 510 for the retrieval of the next discrete work task from the scheduler 115. On the other hand, if there are no additional work tasks needed to be transmitted to the worker 125, then the "NO" branch is followed to step 245 of FIG. 2.

Figure 6:
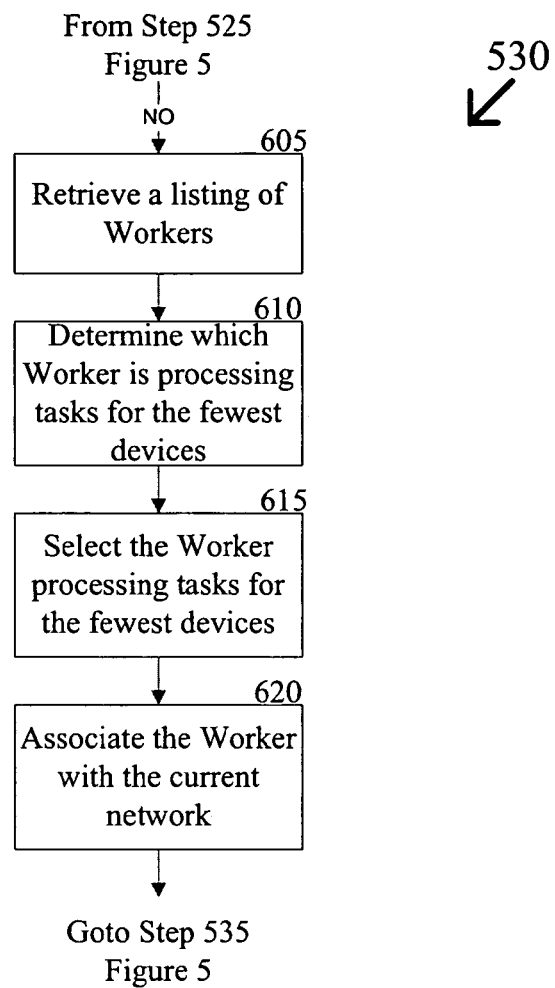
FIG. 6 is a flowchart illustrating a process for associating a worker with a particular network in accordance with an exemplary embodiment of the present invention.

FIG. 6 is a logical flowchart diagram illustrating an exemplary computer-implemented method for associating a worker with a particular network as completed by step 530 of FIG. 5. Now referring to FIGS. 1, 5, and 6, the exemplary method 530 begins with the scheduler 115 retrieving a listing of workers 125 in step 605. In one exemplary embodiment, the listing of workers 125 is based on information provided by the scheduler wrappers 120 when they register with the scheduler 115. In step 610, the scheduler 115 determines which worker 125 is processing tasks for the fewest devices or networks. The scheduler 115 selects the worker 125 processing tasks for the fewest devices in step 615. In one exemplary embodiment, if one or more workers 125 are not currently processing any tasks, the scheduler 115 will select the first worker 125 that it determines in not processing any tasks. In step 620, the scheduler 115 associates the worker 125 with the current network, device, or customer from which discrete event tasks are being processed. The process then continues to step 535 of FIG. 5.

Figure 7:
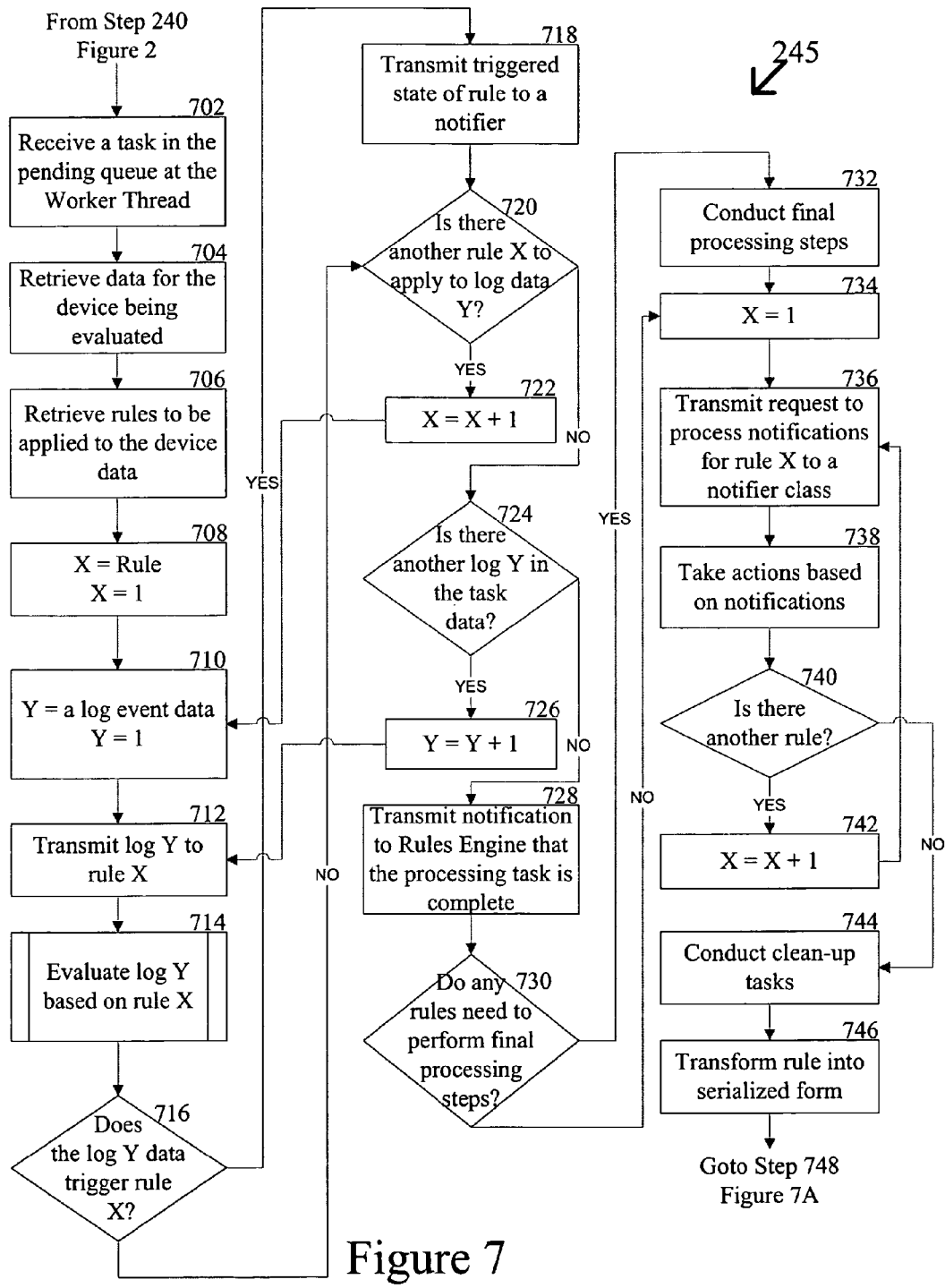
FIGS. 7 and 7A are flowcharts illustrating task processing on the event data in accordance with an exemplary embodiment of the present invention.
Figure 7A:
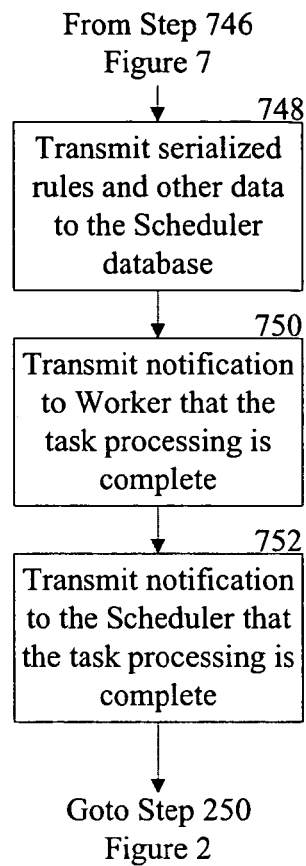

FIGS. 7 and 7A are logical flowchart diagrams illustrating an exemplary computer-implemented method for processing tasks based on a set of rules as completed by step 245 FIG. 2. Referencing FIGS. 1, 2, 7, and 7A, the exemplary method 245 begins with a worker thread 130 receiving a discrete task from the pending queue in step 702. In step 704, the worker thread 130 retrieves data for the device associated with the event data being evaluated from the scheduler database 145.

In one exemplary embodiment, the information retrieved by the worker thread 130 includes the last known device state for the device associated with the event data. The device state is a measure of the knowledge the system 100 has about a given device. The device state incorporates the known "normal" profiles of a given sensor 105, the remedy ID assigned to the device, and any information about open alert tickets associated with the device. In addition, the device state can include "rule state" information, that captures the current state of each persistent rule and any metadata associated with that state. In one exemplary embodiment, this information is maintained in a persistent data store in the scheduler database 145, which enables any worker 125 to access the data when it gets the analysis task for a given device.

In step 706, the worker thread retrieves rules to be applied to the event data associated with the device from the rules engine 150. Counter variable X is set equal to one in step 708. Counter variable X represents each discrete rule retrieved from the rules engine 150. In step 710, counter variable Y is set equal to one. Counter variable Y represents a log of discrete task data for a device. In step 712, the worker thread 130 transmits log Y to be analyzed against rule X in the rules engine 150. Log Y is evaluated based on rule X from the rules engine in step 714.

In step 716, an inquiry is conducted by the rules engine 150 to determine if log Y data triggers rule X. If log Y data does trigger rule X, the "YES" branch is followed to step 718 where the rules engine 150 transmits the trigger state of the rule to a notifier in trouble ticketing system 160. If log Y data does not trigger rule X, then the "NO" branch is followed to 720. In step 720, an inquiry is conducted by the worker thread 130 to determine if there is another rule X to apply to log Y data. If there is another rule to apply to the log Y data, the "YES" branch is followed to step 722, where the counter variable X is incremented by one. The process then returns to step 712 for the transmission of the log Y data to the next rule in the rules engine 150. On the other hand, if there are no additional rules to apply the log Y data to, the "NO" branch is followed to step 724.

In step 724, an inquiry is conducted by the worker thread 130 to determine if there is another log Y of data in the discrete task data. If there is another log Y of data in the task data, the "YES" branch is followed step 726, where the counter variable Y is incremented by one. The process then returns to step 712 for the transmission of the next log Y of data to rule X in the rules engine 150. On the other hand, if there is not another log Y of data, then no branch is followed to step 728, where the worker thread 130 transmits a notification to the scheduler 115 and the rules engine 150 that processing task is complete.

In step 730, an inquiry is conducted to determine if any rules need to perform final processing steps. In one exemplary embodiment, some rules include multiple steps that cannot be completed in a single analysis. For example, a rule may state that once a detection event is determined, the rule should wait for a predetermined amount of time to see if there is a corresponding state change. If the state change does not occur, then the rule can ignore the initial detection event. These rules are given the opportunity to conduct their final processing steps before the rules engine 150 completes the task processing step. If some rules need to perform final processing steps, the "YES" branch is followed to step 732, where each rule conducts its final processing steps. On the other hand, if there are not any rules that need to perform final processing steps, then the "NO" branch is followed step 734, where counter variable X is set equal to one.

In step 736, the worker threads 130 transmit request notifications, or alerts, for the first rule to the notifier class. The trouble ticketing system 160 takes actions based on the notifications in steps 738. In one exemplary embodiment, the actions taken by the trouble ticketing system 160 may include generating an incident report 155, setting off an audible or visual alarm, sending textual, audio, or video messages to electronic devices including, but not limited to telephones, pagers, cell phones, email systems, voice mail systems, and PDA's that describe the alert, the device or customer associated with the event data that triggered the alert, a summary of the reason for the alert and a description of the device.

In step 740, an inquiry is conducted by the worker thread 130 to determine if there is another rule for which request must be transmitted. If so, the "YES" branch is followed to step 742, where the counter variable X is incremented by one. The process returns to step 736 to transmit a request for the next rule to the notifier class. On the other hand, if there is not another rule, then the "NO" branch is followed to step 744, where clean-up task are conducted on the rules processed. In one exemplary embodiment, clean-up tasks include requesting that the rule release any state that is not significant, if the rule is holding open connections to data sources, such as the MSS database 135 or the XPS database 140, it will close them, and conduct any other action necessary to bring each rule back to a zero state.

In step 746, the rules are transformed in to a serialized form. Serializing the rules typically includes taking the state of the rule in memory and reducing it to a form that can be inserted into the scheduler database 145, so that the rule can be recreated exactly in the same form as it was previously. In one exemplary embodiment, serialization includes converting the rule into a byte stream that can be reloaded into memory. In step 748, the worker thread 130 through the schedule wrapper 120 transmits the serial rules and other data related to the analysis to the scheduler database 145. The worker thread 130 transmits notification to the worker 125 that the task processing is complete in step 750. In step 752, the worker 125 through the scheduler wrapper 120 transmits notification to the scheduler 115 that the task processing is complete. The process then returns to step 250 of FIG. 2.

Figure 8:
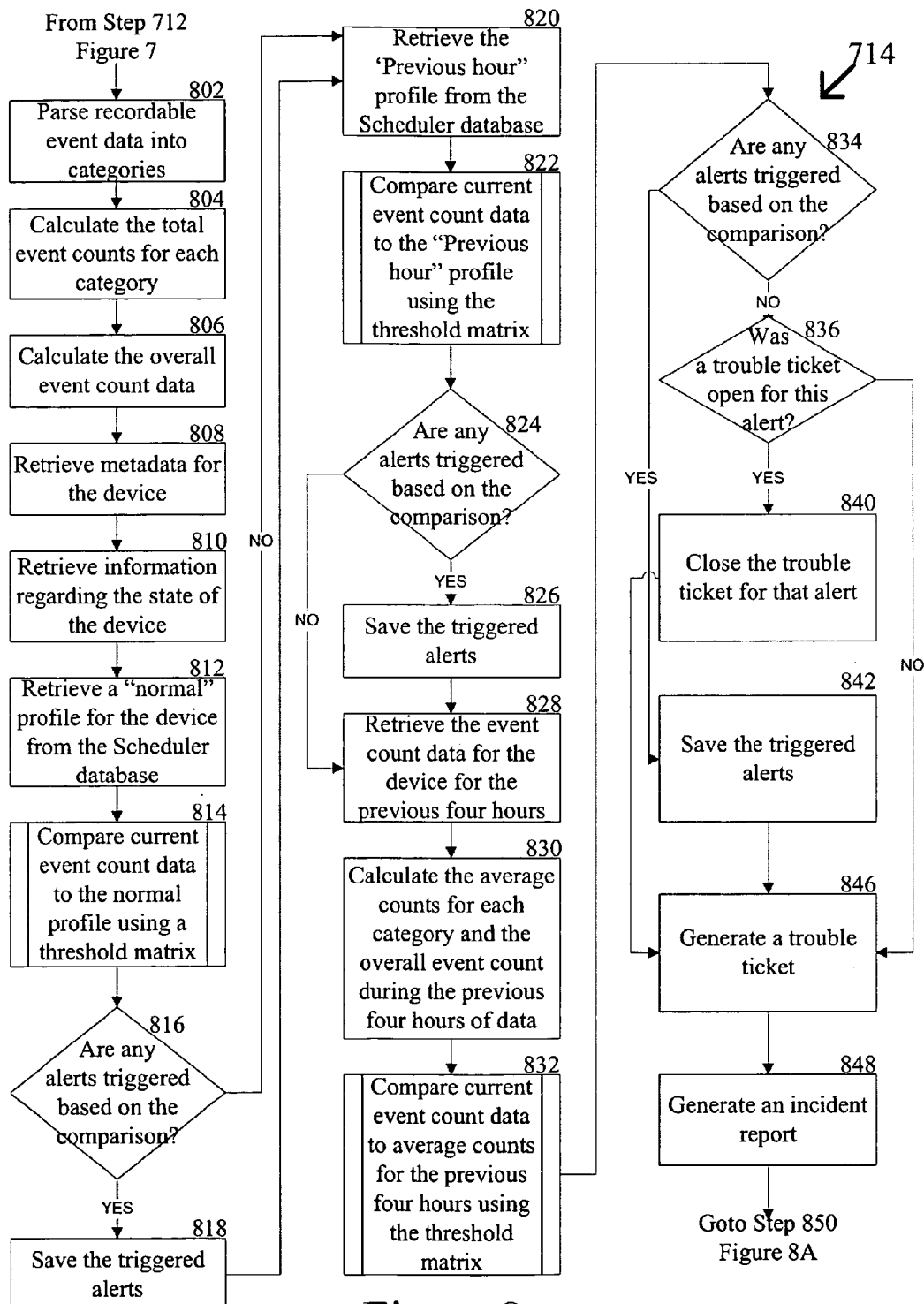
FIGS. 8 and 8A are flowcharts illustrating a process for evaluating the event data based on a set of rules in accordance with an exemplary embodiment of the present invention.
Figure 8A:
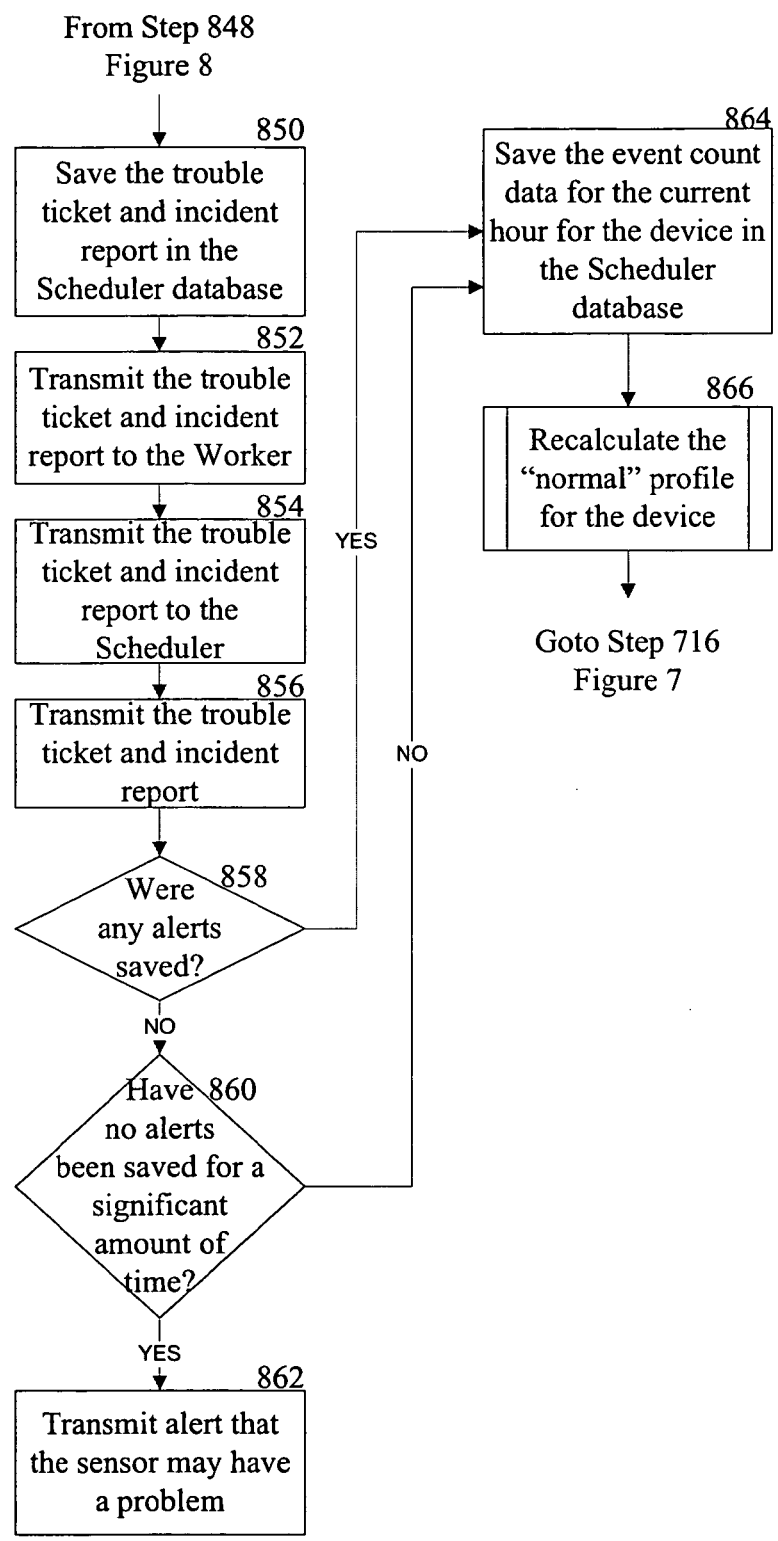

FIGS. 8 and 8A are logical flowchart diagrams illustrating an exemplary computer-implemented method for evaluating log data based on rule X as completed by step 714 of FIG. 7. Now referring to FIGS. 1, 7, 8, and 8A, the exemplary method 714 begins with the scheduler 115 summarizing the log data into categories in step 802. In step 804, the total event counts for each category are calculated. In one exemplary embodiment, the calculation of total event counts is achieved by summing the total number of events placed sorted into the category. The overall event count data is calculated in 806. The overall event count represents the sum of the total event counts for all of the categories for a device or network.

In step 808, metadata for the device being analyzed is retrieved from the information database 137. In step 810, information regarding the state of the device is retrieved. As discussed in greater detail above, the device state is a measure of the knowledge the system 100 has about a given device. The worker thread 130 retrieves the "normal" profile for the device being analyzed from the scheduler database 145 in step 812. In one exemplary embodiment, each device has multiple "normal" profiles, each profile calculated for a specific hour of the day and a specific day of the week. For example, a device may have a "normal" profile designated "Tuesday—11 a.m." and another designated "Thursday—4 p.m." When event data is retrieved from the sensor 105 for the device during the 11 a.m. hour on a Tuesday, the worker thread 130 will retrieve the "Tuesday—11 a.m. normal profile" from the scheduler database 145 for comparison analysis.

In step 814, the worker thread 130 compares the current event count data to the "normal" profile using the threshold matrix. The threshold matrix will be described in more detail in FIGS. 9 and 11. In step 816, an inquiry is conducted by the worker thread 130 to determine if any alerts have been triggered based on the comparison of the current event count data and the "normal" profile for the device. If alerts are triggered, the "YES" branch is followed to step 818, where the triggered alerts are saved for later processing. On the other hand, if no alerts are triggered, then the "NO" branch is followed to step 820. In step 820, the worker thread 130 retrieves the previous hour profile from the scheduler database 145.

In one exemplary embodiment, the previous hour profile is the event count data for each category and the overall event count for all categories for the device that was analyzed by the system during the hour prior to the time the current event data was obtained. One reason the event count data for the prior hour is analyzed, is to determine if there has been a sudden spike in event counts for one or more categories. Those of ordinary skill in the art will recognize that the prior event count retrieve could be composed of the prior hour's data, a single data count taken over multiple hours or a portion of a single hour, any other temporal division, or the most recently completed analysis of event counts for the device, irrespective of time.

In step 822, the worker thread 130 compares the current event count data to the "previous hour" profile using the threshold matrix. In step 824, an inquiry is conducted to determine if there are any alerts triggered based on the comparison of the "previous hour" profile in the current event count data. If alerts are triggered, the "YES" branch is followed to step 826, where the triggered alerts are saved for processing at a later time. On the other hand, if no alerts are triggered, then the "NO" branch is followed to step 828.

In step 828, the worker thread 130 retrieves the event count data for the device for the previous four hours from the scheduler database 145. While the exemplary embodiment describes the selection of the previous four hours of event count data, those of ordinary skill in the art will recognize that greater or fewer than the prior four hours of event count data may be retrieved. Retrieval may also be made irrespective of a particular amount of time, such that, for example, the prior four completed analyses of the event count data for the device may be retrieved irrespective of the time that each analysis was conducted. The worker thread 130 calculates the average counts for each category and the overall event count during the previous four hours data in step 830. In step 832, the worker thread 130 compares the current event count data to the average counts for the previous four hours using the threshold matrix.

In step 834, an inquiry is conducted by the worker thread 130 to determine if any alerts are triggered based on the comparison of the current event count data and the average of the previous four hours event counts for each category and the overall event counts. If alerts are triggered, the "YES" branch is followed to step 842. Otherwise, if there were not any alerts triggered, the "NO" branch is followed to step 836. In step 836, an inquiry is conducted by the worker thread 130 to determine if a trouble ticket was previously opened for this alert in this category of the device. If a trouble ticket was previously opened, the "YES" branch is followed to step 840, where the trouble ticket is closed. On the other hand, if a trouble ticket was not previously opened, the "NO" branch is followed to step 844. In step 842, the triggered alerts are saved in the scheduler database 145.

In step 846, the worker thread 130 generates a trouble ticket at the trouble ticketing system 160 in one exemplary embodiment the trouble ticket may include information such as an incident report 155 transmitted to the trouble ticketing system 160. In step 848, an incident report in generated by the trouble ticketing system 160. In step 850, the worker thread 130 saves the trouble ticket and incident report in the scheduler database 145. In step 852, the worker thread 130 transmits the trouble ticket and incident report to the worker 125. The worker 125 transmits the trouble ticket an incident report 155 to the scheduler 115 in step 854. In step 856, the scheduler 115 transmit the trouble ticket an incident report 155 to an evaluator for evaluation.

In step 858, in an inquiry is conducted by the worker threads 130 to determine if any alerts were saved for later processing. If there were no alerts were saved for processing, then the "NO" branch is followed to step 860. Otherwise the "YES" branch is followed to step 864. In step 860, the worker thread 130 conducts an inquiry to determine if any alerts have been saved for a significant amount of time. In one exemplary embodiment, the worker thread 130 conducts this inquiry in an effort to determine if a sensor 105 for a device is inoperable or not working properly. In one exemplary embodiment, if alerts have not been saved for two consecutive hours, that would be considered a significant amount of time. If no alerts have been saved for a significant amount of time, the "YES" branch is followed to step 862 where the worker thread 130 transmits an alert to the trouble ticketing system 160 that the sensor 105 associated with the device or network may have a problem. On the other hand, if alerts have been saved or a significant time has not been reached, then the "NO" branch is followed to step 864. In step 864, the worker thread 130 through the schedule wrapper 120 saves the event count data for the current hour for that device or network in the scheduler database 145. In step 866, the worker thread 130 recalculates the "normal" profile for the device or network for which the event data was received. The process then continues to step 716 of FIG. 7.

Figure 9:
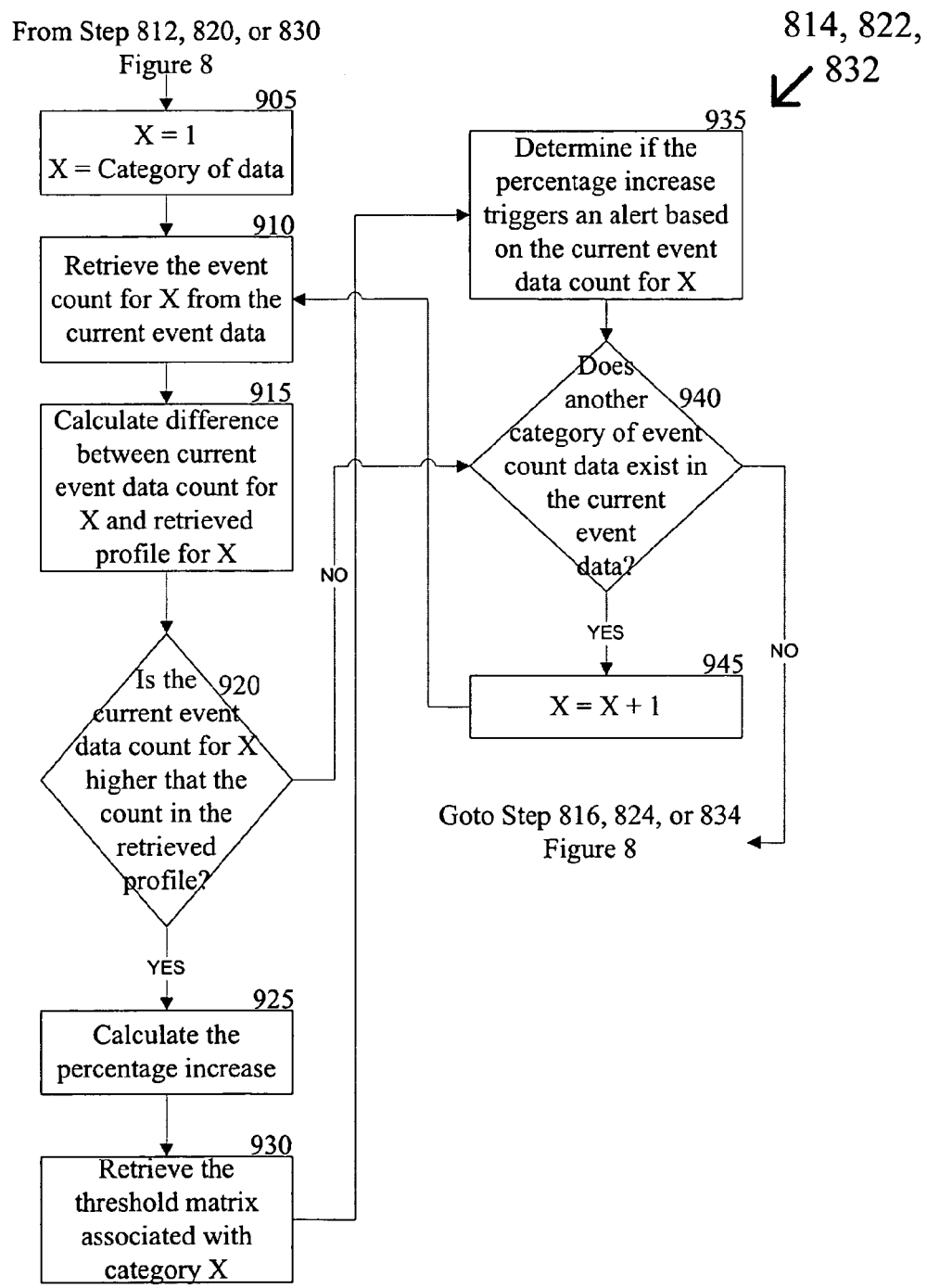
FIG. 9 is a flowchart illustrating a process for comparing data obtained in the task processing to previous data obtained in regards to the device of the computing system in accordance with an exemplary embodiment of the present invention.

FIG. 9 is a logical flowchart diagram illustrating an exemplary computer-implemented method for comparing current event count data to other data using the threshold matrix as completed by steps 814, 822 and 832 of FIG. 8. Referencing FIGS. 1, 8, and 9, the exemplary method 814, 832, and 832 begins with counter variable X being set equal to one in step 905. Counter variable X represents a category of data as previously described above. In step 910, the worker thread 130 retrieves the event count for the first category of data from the current event data.

In step 915, the worker thread 130 calculates the difference between the current data count for the first category of data and the retrieved profile of count data for the first category of data. As discussed in FIG. 8, the retrieved profile may include the "normal" profile, the "previous hour" profile, and/or the "previous four hour average" profile. In step 920, an inquiry is conducted to determine if the current event data count for the first category of data is greater than the count for that category of data in the retrieved profile. If the current event data count is greater, the "YES" branch is followed to step 925, where the worker thread 130 calculates the percentage increase in the data count for the first category.

The worker thread 130 retrieves the threshold matrix associated with the first category in step 930. In one exemplary embodiment, the system 100 may retrieve a single threshold matrix for every device of every customer, a different threshold matrix for each customer, a different threshold matrix for each device of each customer, a particular threshold matrix for a particular type of device, or any other combination known to those of ordinary skill in the art. In step 935, the worker thread 130 determines that the percentage increase triggers an alert based on the current event data count for the first category of data.

Figure 11:
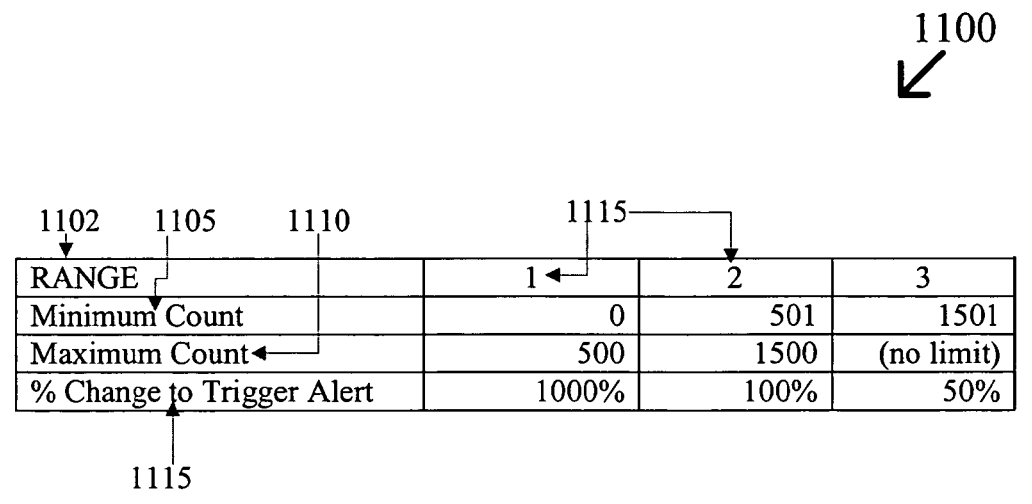

FIG. 11 provides and exemplary block diagram of a threshold matrix. As shown in FIG. 11, the exemplary threshold matrix 1100 includes a table 1102. The threshold matrix table 1102 includes rows for "minimum count" 1105, "maximum count" 1110, and "percentage change to trigger an alert" 1115. The threshold matrix table 1102 also includes one or more columns of count rages 1115 that provide the range of event count and the percentage change needed at that event count level to trigger an alert.

An example of incorporating the exemplary threshold matrix 1100 may be helpful. Using the example of a first category and a comparison of the current event count data for the first category having a count of 508 and the "normal" profile for the first category having an event count of 250. Because the current event count for the first category is 508 the percentage change needed to trigger an alert is selected from column 2 of the matrix 1100, based on the fact that 508 lies in between 501 and 1500. Thus, only if the percentage increase in the current event count over the "normal" profile for the first category is greater than 100% will the alert be triggered. In this example, the current event count is greater than the "normal" profile count and the difference is calculated as 258. When 258 is divided by 250, the "normal" profile count, the percentage increase is determined to be 103.2% and the alert is triggered.

Returning to FIG. 9, in step 940, an inquiry is conducted to determine if there is another category of event count data that exists in the current event data. Returning to step 920, if the current event data count for the first category of data is not higher than the count for the retrieved profile, then the "NO" branch is followed to step 940. In step 940, if another category of event count data exists, the "YES" branch is followed to step 945. In step 945, the counter variable X is incremented by one. The process then returns to step 910 for the retrieval of the next event count for the particular category of data. On the other hand, if there are no additional categories of event count data, then the "NO" branch is followed to step 816, 824, or 834 of FIG. 8.

Figure 10:
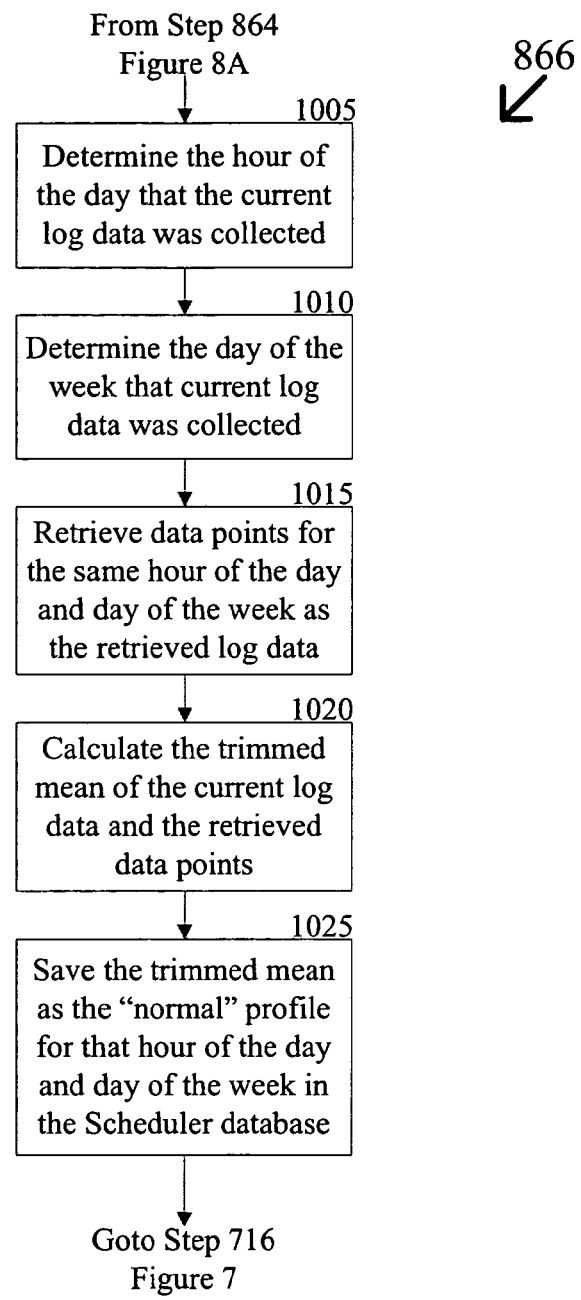
FIG. 10 is a flowchart illustrating a process for recalculating the "normal" profile for a device on the computing system in accordance with an exemplary embodiment of the present invention.

FIG. 10 is a logical flowchart diagram illustrating an exemplary computer-implemented method for recalculating the normal profile for a device associated with the event data retrieved by the sensor 105 and analyzed by the worker thread 130 as completed by step 866 of FIG. 8. Now referring to FIGS. 1, 8A, and 10, the exemplary method 866 begins with the worker thread 130 determining the hour of the day of the current log data that was retrieved by the sensor 105 in step 1005. In step 1010, the worker thread 130 determines the day of the week the current log data was retrieved by the sensor 105. The worker thread 130 retrieves data points for the same hour of the day and the same day of the week as the retrieved log data in step 1015.

In step 1020, the worker thread calculates the trimmed mean of the current logged data and the retrieved data points. In one exemplary embodiment, the trimmed mean is calculated by evaluating all of the data points, event counts, including the current event count for the first each category, removing the minimum and maximum event count and calculating the average as the "normal" profile for that category. In an alternative embodiment, the trimmed mean is calculated by determining the standard deviation of all of the data points for the category, removing the data points that are outside a certain number of standard deviations, and calculating the average count based on the remaining data points.

In another alternative embodiment, the trimmed mean is calculated by generating a weighted average by giving greater preference, and thus, greater weight, to data points obtained more recently as compared to older data points. The worker thread 130 saves the trimmed mean as the "normal" profile in the scheduler database 145 for the particular hour of the day and day of the week that the event data was collected by the sensors 105 in step 1025. The process then continues of 848 of FIG. 8A.

In conclusion, the present invention supports a computer-implemented method for retrieving event data from a device on a network, categorizing recordable events in the event data, and comparing the categorized counts to stored profiles of data for that device against a threshold matrix to determine if alerts should be triggered for the device. It will be appreciated that the present invention fulfills the needs of the prior art described herein and meets the above-stated objectives. While there have been shown and described several exemplary embodiments of the present invention, it will be evident to those skilled in the art that the various modifications and changes may be made thereto without departing from the spirit and the scope of the present invention as set forth in the appended claims and equivalence thereof.

We claim:

1. A method for managing events, comprising:
    receiving, by a computer, a multiplicity of event data that represents a respective multiplicity of events corresponding to the device;
    adding, by the computer, the multiplicity of event data to a queue for the device;
    based on a characteristic of a potential attack associated each of the multiplicity of events, categorizing, by the computer, the multiplicity of event data into at least one of a scanned event category that represents scanning attacks against the device, a worm signature event category that represents worm attacks against the device, a sweeps signature event category that represents sweep attacks against a network leading to the device, and a hot decodes signature event category that represents high priority signatures tracked by a user;
    determining, by the computer, a total number of events in each of the categories;
    determining, for each category, a stored profile of the events for each of the events corresponding to the device;
    calculating, by the computer, a percentage increase of the total number of events for each of the categories based on the total number of events of each of the categories and the stored profile of events of the respective category;
    determining, by the computer, a range of number of events within which the total number of events for each category fits, the range of number of events of each of the categories represented by a threshold matrix,
        wherein the threshold matrix comprises one or more ranges of number of events,
        wherein each range of the number of events comprise a maximum and minimum event count value, and
        wherein each range of the number of events is associated with an alert percentage value;
    for each of the categories, determining, by the computer, the alert percentage value associated with the range of the number of events within which the total number of events for the respective category fits, the alert percentage value comprising a value above-which alerts are triggered; and
    for each of the categories, determining, by the computer, if the percentage increase of the number of events is greater than the alert percentage value of the respective category to generate an alert.

2. The method of claim 1, further comprising:
    receiving, by the computer, another event data for another event corresponding to the device;
    adding, by the computer, the other event data to the queue for the device; and
    categorizing, by the computer, the other event as a staging signature event if the other event data comprises a signature that is tested for inclusion into other categories.

3. The method of claim 1, further comprising categorizing the multiplicity of event data in the queue for the device responsive to determining that the queue associated with the device is full.

4. The method of claim 1, further comprising categorizing the events in the event data responsive to determining that the queue is not full and a predetermined time passes a prior categorization of events represented by respective event data on the queue.

5. The method of claim 1, wherein the step of calculating a percentage increase of the number of events for each category further comprises:
    determining, by the computer, that the total number of events for each of the categories is greater than a count associated with the stored profile of events for the respective category;
    for each of the categories, responsive to a positive determination that the total number of events is greater than the count associated with the stored profile of events,
        calculating, by the computer, the difference between the total number of events and the count associated with the stored profile of events; and
        calculating, by the computer, a percentage increase of the total number of events over the count associated with the stored profile of events.

6. The method of claim 1, wherein the stored profile of events associated with each of the categories is a normal profile count for the respective category, the normal profile count comprising an evaluation of a total number of events for the respective category associated with the device when the device is operating properly.

7. The method of claim 1, wherein the stored profile of events associated with each of the categories is a previous profile count for the respective category, the previous profile count comprising a total number of events for the respective category as determined in a most recent prior analysis of the event data for the device.

8. The method of claim 1, wherein the stored profile of events associated with each of the categories is an average profile count for the respective category, the average profile count calculated based on two or more previous profile counts for the respective category of the device as determined in a prior analysis of the event data for the device.

* * * * *